(12) United States Patent
Gundeti et al.

(10) Patent No.: US 10,055,190 B2
(45) Date of Patent: Aug. 21, 2018

(54) ATTRIBUTE-BASED AUDIO CHANNEL ARBITRATION

(71) Applicant: Amazon Technologies, Inc., Seattle, WA (US)

(72) Inventors: Vikram Kumar Gundeti, Seattle, WA (US); Fred Torok, Seattle, WA (US); Peter Spalding VanLund, Wilmington, WA (US); Frederic Johan Georges Deramat, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 335 days.

(21) Appl. No.: 14/107,931

(22) Filed: Dec. 16, 2013

(65) Prior Publication Data

US 2015/0170665 A1 Jun. 18, 2015

(51) Int. Cl.
*G10L 15/00* (2013.01)
*G06F 3/16* (2006.01)

(52) U.S. Cl.
CPC .................................. *G06F 3/165* (2013.01)

(58) Field of Classification Search
CPC ....... G10L 15/22; G10L 15/222; G10L 25/78; G10L 15/223; G10L 15/225; G10L 15/227; G10L 15/228; G10L 15/226; G10L 17/22; G10L 2015/223; G10L 15/20; G10L 15/26; G10L 21/0272; G10L 15/00; G10L 15/30; G10L 19/00; G10L 2015/221;

(Continued)

(56) References Cited

U.S. PATENT DOCUMENTS 5,825,867 A * 10/1998 Epler ................... H04M 1/006
  379/197
6,246,986 B1 * 6/2001 Ammicht ............... G10L 15/22
  704/231

(Continued)

FOREIGN PATENT DOCUMENTS

WO WO2011088053 A2 7/2011
WO WO2013180874 12/2013

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

(Continued)

*Primary Examiner* — Abdelali Serrou
(74) *Attorney, Agent, or Firm* — Lee & Hayes, PLLC

(57) ABSTRACT

A speech-based system includes a local device in a user premises and a remote service that uses the local device to conduct speech dialogs with a user. The local device may also be directed to play audio such as music, audio books, etc. When designating audio for playing by the local device, the remote service may specify that the audio is either background audio or foreground audio. For background audio, the service indicates whether the background audio is mixable. For foreground audio, the service indicates an interrupt behavior. When the local device is playing background audio and receives foreground audio, the background audio is paused, attenuated, or not changed based on the indicated interrupt behavior of the foreground audio and whether the background audio has been designated as being mixable.

18 Claims, 4 Drawing Sheets

(58) Field of Classification Search
CPC . G10L 2021/02082; G10L 2021/02166; G10L 21/00; G10L 21/0208; G10L 21/0216; G10L 21/10; H04L 51/04; H04L 51/38; H04L 51/10; H04L 51/12; G06F 17/30026; G06F 17/30061; G06F 17/30749; G06F 2203/04803; G06F 2203/04806; G06F 2203/04808; G06F 3/04815; G06F 3/04845; G06F 3/04883; G06F 3/167; G06F 3/165; G06F 3/0482; G06F 3/0488; G06F 17/21; G06F 17/28; G06F 17/30654; G06F 17/30976; G06F 3/012; G06F 3/017; G06F 3/0304; G06F 3/0346; G06F 3/0481
See application file for complete search history.

(56) References Cited

U.S. PATENT DOCUMENTS

| | | | |
|---|---|---|---|
| 6,848,002 B1 | 1/2005 | Detlef | |
| 6,882,973 B1* | 4/2005 | Pickering | G10L 15/222 379/88.02 |
| 7,062,440 B2* | 6/2006 | Brittan | G10L 13/00 704/266 |
| 7,069,221 B2* | 6/2006 | Crane | G10L 15/222 704/233 |
| 7,162,421 B1* | 1/2007 | Zeppenfeld | G10L 15/22 704/233 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 7,848,314 B2* | 12/2010 | Cross, Jr. | G10L 15/222 370/276 |
| 8,000,971 B2* | 8/2011 | Ljolje | G10L 15/063 704/233 |
| 8,046,221 B2* | 10/2011 | Ljolje | G10L 15/142 369/25.01 |
| 8,180,025 B2* | 5/2012 | Pieraccini | H04M 3/493 340/7.51 |
| 8,374,879 B2* | 2/2013 | Falcon | G01C 21/26 704/231 |
| 8,417,223 B1* | 4/2013 | Trivi | H04M 3/53366 455/412.1 |
| 8,532,269 B2* | 9/2013 | Chambers | G10L 15/20 379/88.04 |
| 8,660,843 B2* | 2/2014 | Falcon | G01C 21/26 704/270.1 |
| 9,026,438 B2* | 5/2015 | Buck | G10L 15/222 379/208.01 |
| 2003/0171928 A1* | 9/2003 | Falcon | G10L 15/22 704/275 |
| 2003/0171929 A1* | 9/2003 | Falcon | G10L 15/30 704/275 |
| 2005/0027527 A1* | 2/2005 | Junkawitsch | G10L 15/20 704/243 |
| 2005/0131704 A1 | 6/2005 | Dragosh et al. | |
| 2007/0014422 A1* | 1/2007 | Wesemann | H04H 60/04 381/119 |
| 2007/0098351 A1* | 5/2007 | East | H04H 20/33 386/262 |
| 2007/0143115 A1* | 6/2007 | Falcon | G01C 21/26 704/270.1 |
| 2008/0089530 A1* | 4/2008 | Bostick | H03G 3/32 381/74 |
| 2012/0223885 A1 | 9/2012 | Perez | |
| 2012/0245935 A1* | 9/2012 | Wong | H04W 4/12 704/235 |
| 2013/0218574 A1* | 8/2013 | Falcon | G01C 21/26 704/275 |
| 2013/0288655 A1* | 10/2013 | Foruntanpour | H04M 1/6008 455/418 |
| 2013/0316679 A1 | 11/2013 | Miller et al. | |
| 2014/0018050 A1* | 1/2014 | Isidore | H04M 1/72519 455/414.1 |
| 2014/0052438 A1* | 2/2014 | Yerrace | G06F 3/162 704/201 |

OTHER PUBLICATIONS

PCT Search Report and Written Opinion dated Mar. 12, 2015 for PCT Application No. PCT/US14/69761, 8 Pages.
Extended European Search Report dated Jul. 7, 2017 for European patent application No. 14870984.3, 8 pages.

* cited by examiner

ATTRIBUTE-BASED AUDIO CHANNEL ARBITRATION

BACKGROUND

Homes, offices, automobiles, and public spaces are becoming more wired and connected with the proliferation of computing devices such as notebook computers, tablets, entertainment systems, and portable communication devices. As computing devices evolve, the ways in which users interact with these devices continue to evolve. For example, people can interact with computing devices through mechanical devices (e.g., keyboards, mice, etc.), electrical devices (e.g., touch screens, touch pads, etc.), and optical devices (e.g., motion detectors, camera, etc.). Another way to interact with computing devices is through audio devices that understand and respond to human speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
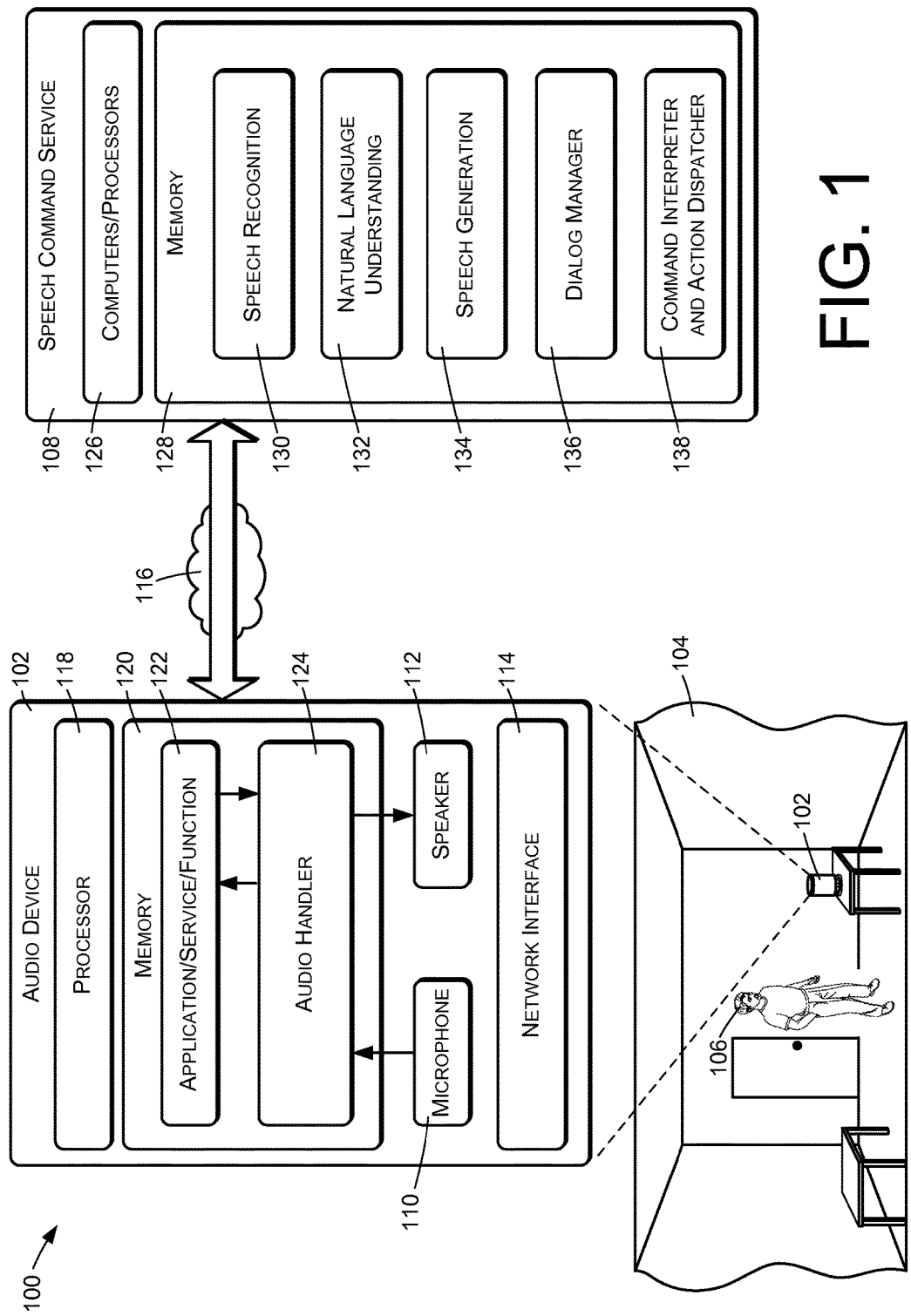
FIG. 1 is a block diagram of an illustrative voice interaction computing architecture that includes a local audio device and a remote speech command service.

This disclosure pertains generally to a device and system that interact with users through speech to provide functions and services. A local device may be controlled by a remote, network-based speech command service, which may be configured to interact with a user by generating speech messages to the user and responding to user speech. The device may also be configurable to play audio content such as music.

The speech command service may conduct speech dialogs with a user in order to determine the actions desired by the user. A dialog may include a sequence or series of speech expressions that may include system-generated and user-uttered speech. For example, the user may speak a command, and the speech command service may respond with a speech message asking for clarification. The user may then response with a spoken expression conveying additional information. When the speech command service has received enough information, it may initiate a function or service based on the understood intent of the user.

In addition to speech, the device may be configured to play music or other audio content. For example, the user may request through a dialog that the device play a specific music title. In response, the speech command service may direct the device to obtain audio from a specified source, such as a network-based music repository or other content provider. The device may then stream the music from the specified source and play the music on a speaker.

Two types of audio are defined, which are referred to herein as background and foreground audio. When specifying audio for playback by the device, the speech command service specifies that the audio is either foreground audio or background audio. In addition, the speech command service specifies attributes to be associated with the audio. For background audio, the speech command service specifies a mixing attribute, also referred to as an is_mixable attribute, which indicates how or whether the background audio should be mixed with foreground audio. For foreground audio, the speech command service specifies an interrupt attribute, also referred to as a mixing behavior attribute, which indicates how currently playing background audio should be handled when playing the foreground audio. The interrupt attribute may specify one of several behaviors, which may correspond to normal, attenuate, and pause behaviors.

The speech command service may at times send speech messages or other types of audio to the device while music or other audio is being played. Audio such as this is considered and designated by the speech command service as foreground audio. Music and other similar types of audio content are designated as background audio. By specifying appropriate attributes for the foreground and background audio, the background audio can be attenuated or paused during speech messages. Playing of the background audio is resumed at a normal listening volume after or at the end of a dialog with the user.

When the interrupt attribute of the foreground audio is normal and the mixable property of the background audio is mixable, the foreground audio is mixed with the background audio. When the interrupt attribute of the foreground audio is attenuate and the mixable property of the background audio is mixable, the foreground audio is mixed with the background audio and the background audio is attenuated. When the interrupt attribute of the foreground audio is pause, the background audio is paused before playing the foreground audio. In any case where the mixable attribute of the background audio is not_mixable, the background audio is paused before playing the foreground audio, regardless of the interrupt attribute.

FIG. 1 shows an example of a voice interaction computing system 100. The system 100 may include or may utilize a local voice-based audio device 102 that is capable of playing various types of audio. The voice-based audio device 102 may be located within an environment 104 such as a home to provide services for a user 106. The local voice-based audio device 102 may operate in conjunction with and/or under the control of a remote, network-based speech command service 108 that is configured to receive audio, to recognize speech in the audio, and to perform functions or services in response to the recognized speech. Such functions or services may be implemented by the speech command service 108 independently of the audio device 102, and/or may be implemented by providing a command to the audio device 102 for local execution by the audio device 102. For example, the speech command service 108 may instruct the audio device 102 to play music or other audio content.

The audio device 102 may have one or more microphones 110 and one or more audio speakers or transducers 112 to facilitate audio interactions with the user 106. The audio device 102 may have a network communications interface 114 for communications over a communications network 116 with the speech command service 108. The communications network 116 may comprise a public network such as the Internet or may comprise any of various other types of public and private networks.

In certain embodiments, the primary mode of user interaction with the audio device 102 and speech command service 108 is through speech. For example, the audio device 102 may receive spoken command expressions from the user 106 and may provide services in response to the commands. The user may speak a predefined wake or trigger expression (e.g., "Awake"), which may be followed by commands or instructions (e.g., "I'd like to go to a movie. Please tell me what's playing at the local cinema."). Provided services may include performing actions or activities, rendering media, obtaining and/or providing information, providing information via generated or synthesized speech via the audio device 102, initiating Internet-based services on behalf of the user 106, and so forth.

The speech command service 108 may also conduct speech dialogs to determine user intent. Generally, a speech dialog comprises a sequence of speech questions, answers, and/or statements pertaining to a particular action or intent of the user. More specifically, a speech dialog may comprise a series of speech expressions that may include utterances by the user 106 and speech messages generated by the speech command service 108. A speech dialog, for example, may begin upon an initial user utterance. The speech command service 108 may respond by asking a question, such as "what do you want to do?" The user may respond by making a statement in answer to the question. This process may iterate until the speech command service 108 is able to determine a specific action to take or function to invoke.

The audio device 102 includes operational or control logic, which in many cases may comprise a processor 118 and memory 120. The processor 118 may include multiple processors and/or a processor having multiple cores. The processor 118 may also comprise or include a digital signal processor for processing audio signals.

The memory 120 may contain applications and programs in the form of computer-executable instructions that are executed by the processor 118 to perform acts or actions that implement desired functionality of the audio device 102, including the functionality described below. The memory 120 may be a type of computer-readable storage media and may include volatile and nonvolatile memory. Thus, the memory 120 may include, but is not limited to, RAM, ROM, EEPROM, flash memory, or other memory technology.

The audio device 102 may include a plurality of applications, services, and/or functions 122, referred to collectively below as functional components 122, which are executable by the processor 118 to provide services and functionality. The applications and other functional components 122 may include media playback services such as music players. Other services or operations performed or provided by the applications and other functional components 122 may include, as examples, requesting and consuming entertainment (e.g., gaming, finding and playing music, movies or other content, etc.), personal management (e.g., calendaring, note taking, etc.), online shopping, financial transactions, database inquiries, person-to-person voice communications, and so forth.

In some embodiments, the functional components 122 may be pre-installed on the audio device 102, and may implement core functionality of the audio device 102. In other embodiments, one or more of the applications or other functional components 122 may be installed by the user 106 or otherwise installed after the audio device 102 has been initialized by the user 106, and may implement additional or customized functionality as desired by the user 106.

The memory 120 may also contain an audio handler 124 that is executed by the processor 118. The audio handler 124 may comprise drivers, processors, and/or other components to process and exchange audio signals and other audio information between the audio device 102 and the speech command service 108. For example, the audio handler 124 may receive input audio from the microphone 110 and provide such audio to the speech command service 108. As another example, the audio handler 124 may receive speech messages, output audio, and other audio information from the speech command service 108 and play any specified audio on the speaker 112.

Although the audio device 102 is described herein as a voice-controlled or speech-based interface device, the techniques described herein may be implemented in conjunction with various different types of devices, such as telecommunications devices and components, hands-free devices, entertainment devices, media playback devices, and so forth.

The speech command service 108 may in some instances be part of a network-accessible computing platform that is maintained and accessible via the network 116. Network-accessible computing platforms such as this may be referred to using terms such as "on-demand computing", "software as a service (SaaS)", "platform computing", "network-accessible platform", "cloud services", "data centers", and so forth.

The audio device 102 and/or the speech command service 108 may communicatively couple to the network 116 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 116 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

The speech command service 108 generally provides functionality for receiving an audio stream from the audio device 102, recognizing speech in the audio stream, determining user intent from the recognized speech, and performing an action or service in response to the user intent. The provided action may in some cases be performed in conjunction with the audio device 102 and in these cases the speech command service 108 may return a response to the audio device 102 indicating a command that is to be executed by the audio device 102.

In some embodiments, the speech command service 108 may provide much of the functionality that is described above as being provided by the functional components 122. For example, music playback may be under the control of the speech command service 108 rather than being locally controlled. Thus, the speech command service 108 may receive a command relating to music playback, and may respond by commanding the audio device 102 to play certain music or to perform another operation with regard to music that is already playing. Because of the control and supervision of the speech command service 108, the audio device 102 may in certain situations provide only low-level services and functions, while the speech command service is responsible for higher-level operational logic and functionality.

The speech command service 108 includes operational or control logic, which in many cases may comprise one or more servers, computers, and or processors 126. The speech command service 108 may also have memory 128 containing applications and programs in the form of instructions that are executed by the processor 126 to perform acts or actions that implement desired functionality of the speech command service, including the functionality specifically described herein. The memory 128 may be a type of computer storage media and may include volatile and non-volatile memory. Thus, the memory 128 may include, but is not limited to, RAM, ROM, EEPROM, flash memory, or other memory technology. In certain implementations, the speech command service 108 may comprise a plurality of servers configured to communicate with multiple audio devices 102 over the Internet.

Among other logical and physical components not specifically shown, the speech command service 108 may comprise speech recognition components 130. The speech recognition components 130 may include automatic speech recognition (ASR) functionality that recognizes human speech in an audio signal provided by the audio device 102 from the microphone 110.

The speech command service 108 may also comprise a natural language understanding component (NLU) 132 that determines user intent based on user speech that is recognized by the speech recognition components 130. The speech command service 108 may further comprise a speech generation component 134 that synthesizes or otherwise produces speech audio. For example, the speech generation component 134 may comprise a text-to-speech component that produces speech from text to produce text messages to be played at the audio device 102.

The speech command service 108 may include a dialog manager 136 that conducts speech dialogs with the user 106 through the audio device 102. A dialog may comprise a series of speech exchanges, as described above, that pertain to a particular intent that the user 106 is trying to express. The speech command service 108 may also comprise a command interpreter and action dispatcher 138 (referred to below simply as a command interpreter 138) that determines functions or commands corresponding to user intents. In some cases, commands may correspond to functions that are to be performed at least in part by the audio device 102, and the command interpreter 138 may in those cases provide commands to the audio device 102 for implementing such functions. Examples of commands or functions that may be performed by the audio device in response to directives from the command interpreter 138 include playing music or other media, increasing/decreasing the volume of the speaker 112, generating audible speech through the speaker 112, initiating certain types of communications with users of similar devices, and so forth.

Note that the speech command service 108 may also perform functions, in response to speech recognized from received audio, that involve entities or devices that are not shown in FIG. 1. For example, the speech command service 108 may interact with other network-based services to obtain information or services on behalf of the user 106. Furthermore, the speech command service 108 may itself have various elements and functionality that may be responsive to speech uttered by the user 106.

Figure 2:
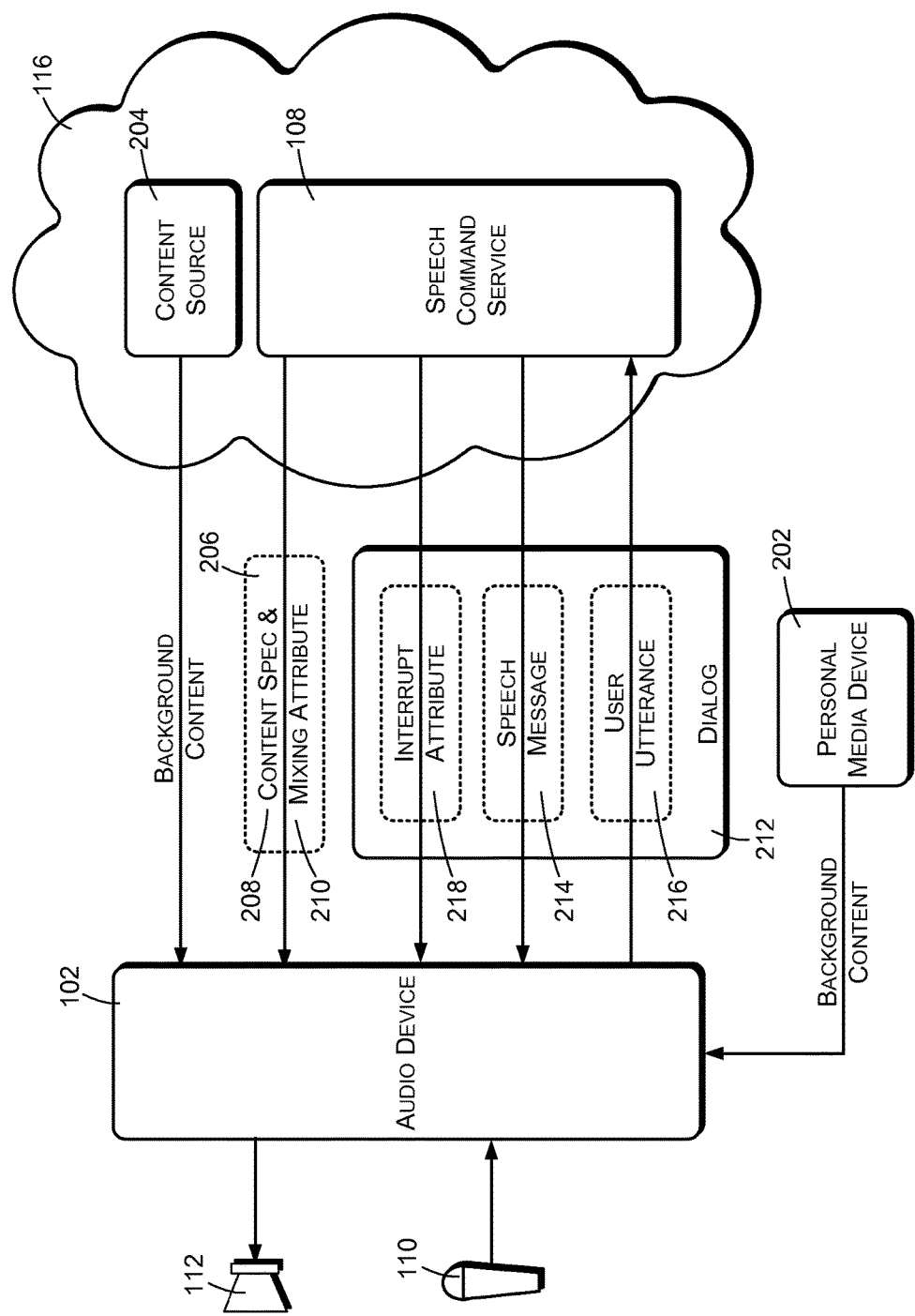
FIG. 2 is a block diagram illustrating an example of information flow between the local audio device and the remote speech command service.

FIG. 2 illustrates operations and interactions of the audio device 102 and the speech command service 108 in an example embodiment. In an example scenario, the speech command service 108 may be playing background content, which may in some situations comprise music or other audio that is intended for listening by the user rather than for interacting with the user. Background content may in some cases comprise passive audio or content, which is audio that does not call for a direct user response and that is not part of a user interaction.

The background content may originate locally in some cases, such as from a personal audio or media device 202 or other local wireless device that provides music to the audio device 102 wirelessly. In other cases, the background content may originate from a network or cloud-based source 204. In some cases, the background content may be specified by the speech command service 108 by sending a command 206 to the audio device 102.

An example command 206 may contain a content specification 208 and a mixing or is_mixable attribute 210. The content specification 208 may comprise a URL (uniform resource locator) or other network address of the content source 204. The content specification 208 may also indicate an identifier of specific content to be obtained and played from the content source 204.

The mixing attribute 210 may indicate whether or not the specified content can appropriately be mixed with foreground content. The mixing attribute 210 may have the value mixable if the background content should be mixed with foreground content. The mixing attribute 210 may have the value not_mixable if the background content should not be mixed with foreground content.

While the audio device 102 is playing background content, the user 106 or the speech command service 108 may initiate a dialog 212. As described above, a dialog includes user-generated and system-generated speech directed to accomplishing a particular task, activity, function, or goal. The user 106 may speak first to alert the speech command service 108 of the user's desire to request some function. The speech command service 108 may respond with further speech, and the user may respond with speech. This cycle may be repeated in order to determine the intent of the user 106 so that an appropriate action may be performed by the speech command service 108 and/or the audio device 102.

Speech that is part of a dialog may be referred to as foreground content. Foreground content may often take priority over background content. Foreground content may in some cases comprise active content. Active content may call for a user response and/or may be part of a two-way interaction with the user.

The dialog 212 may include multiple speech messages 214 generated by the speech command service 108 and provided to the audio device 102. The dialog 212 may also include multiple user utterances or speech segments 216 that are provided by the audio device 102 to the speech command service 108. The dialog 212 extends and is conducted over a time period that includes the alternating sequence of speech messages and user expressions. In some cases, a dialog may end by expiration of a time period, during which no further speech is received from the user.

Note that speech, including speech messages generated by the speech command service 108 and utterances by the user 106, may be communicated between the audio device 102 and the speech command service 108 in various formats. In some cases, speech may be communicated as text. In other cases, speech may be communicated as analog or digital audio signals or as data objects. In some embodiments, user utterances are conveyed to the speech command service 108 in the form of real-time audio signal obtained from the microphone 110. In these embodiments, the speech command service 108 monitors the audio signal to detect user utterances and to recognize any speech in the audio signals.

The speech command service 108 is configured to specify an interrupt attribute 218 for each dialog 212. The interrupt attribute 218 may also be referred to as a mixing behavior attribute. The interrupt attribute 218 specifies how to handle any background audio that is currently playing or that may be initiated or requested during the dialog 212. In the embodiment described, the interrupt attribute 218 may have one of the following values: normal, attenuate, or pause. The interrupt attribute may be specified along with speech messages 214 of the dialog 212 or may be provided in a separate command or communication relating to the dialog 212. In some cases, the interrupt attribute 218 may be associated with or included with a command specifying the speech message 214.

Upon playing an initial speech message of the dialog 212, playback of the currently playing background content is potentially modified in accordance with the interrupt attribute 218, subject to limitations introduced by the mixing attribute 210. If the interrupt attribute 218 is normal, the background content continues to play at its normal listening volume. If the interrupt attribute 218 is attenuate, the background content continues to play, albeit at a reduced or lowered volume. If the interrupt attribute 218 is pause, the background content is paused, and resumed only after the dialog 212 concludes.

However, these behaviors are conditioned by the mixing attribute 210. If the mixing attribute 210 is not_mixable, the background content is paused during the dialog, regardless of the value of the interrupt attribute 218. If the mixing attribute is mixable, the behaviors indicated by the interrupt attribute 218 are implemented as described above.

The currently playing background audio may also be changed when the user initially utters a command expression or other speech, which in some cases may signal the beginning of the dialog 212. For example, the background audio may be immediately attenuated upon detecting user speech or voice activity.

Figure 3:
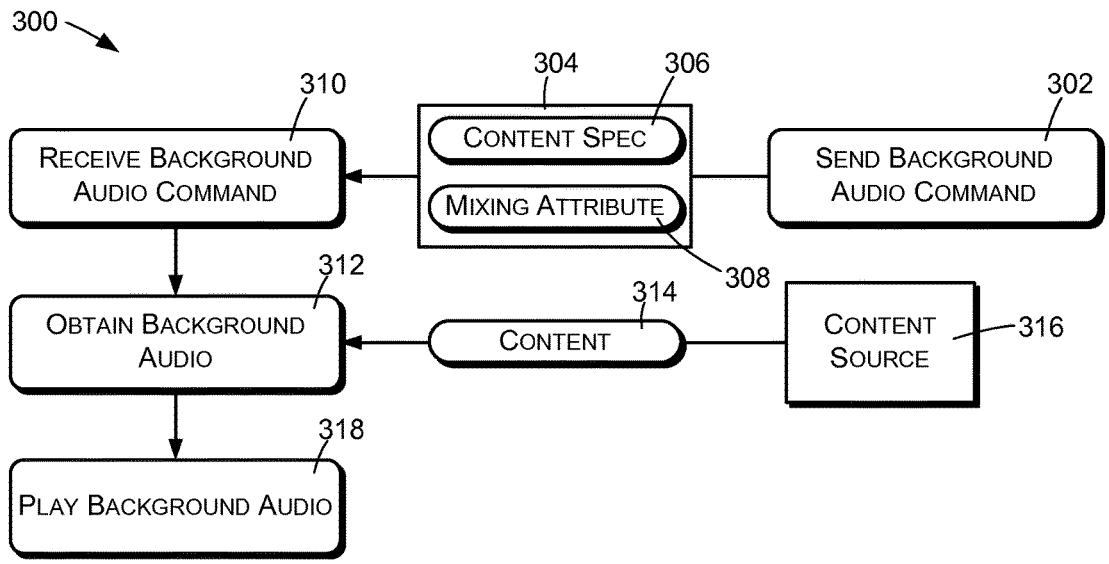
FIG. 3 is a flow diagram illustrating an example method of specifying and playing background audio.

FIG. 3 illustrates an example method 300 that may be implemented in an audio-based or speech-based system such as discussed above to request and play background audio content. An action 302 is performed by a speech command service or other device control component or service that is located remotely from a local, speech-based audio device. The action 302 comprises sending a command 304, referred to herein as a background audio command, to an audio device over a network communications medium such as the Internet. The background audio command 304 may indicate or specify a remote source of music or other audio content, such as by including a content specification 306. In some cases, the music or other content may be included as part of the command 304.

The background audio command 304 may include an indication that the specified audio content is considered background content. The background audio command 304 may also indicate or specify whether the audio content is mixable, such as by specifying a mixing attribute 308 in the background audio command 304. The mixing attribute 308 may have either the value mixable or non-mixable in the described embodiment.

An action 310, performed by a local speech-based audio device such as the audio device 102 described above, comprises receiving the background audio command 304, including the content specification 306 and the mixing attribute 308. The mixing attribute 308 is associated with the background content specified by the content specification 306 and indicates whether or not the background content is of a type that may be suitably mixed with foreground audio. Music, for example, may be suitable for mixing with speech-based foreground content. Spoken word, on the other hand, may not be suitable for mixing with speech-based or other foreground content.

In response to receiving the background audio command 304, the device performs an action 312 of obtaining background audio content 314 from a content source 316 as specified by the content specification 306 of the background audio command 304. The content source may be remote from the device itself. For example, the device may be located locally, in user premises, while the content source may comprise a music streaming service at a location that is geographically distant from the user premises. The background audio content 314 may be obtained through a network communications interface of the audio device by downloading or streaming. In some cases, as mentioned above, the background audio content may be embedded in the background audio command 304.

The background audio content 314 may comprise music or other content such as spoken word. The background audio content 314 may also comprise the sound portion of video or other multimedia content.

An action 318, performed by the local device, comprises playing the obtained background audio content 314 at a comfortable listening volume on a speaker that is part of the device or that is associated with the device. The background audio content 314 may be downloaded in its entirety and then played, or may be streamed and played as it is received. The listening volume, also referred to as a normal playback volume or level, may be set by the user according to the user's preferences.

Figure 4:
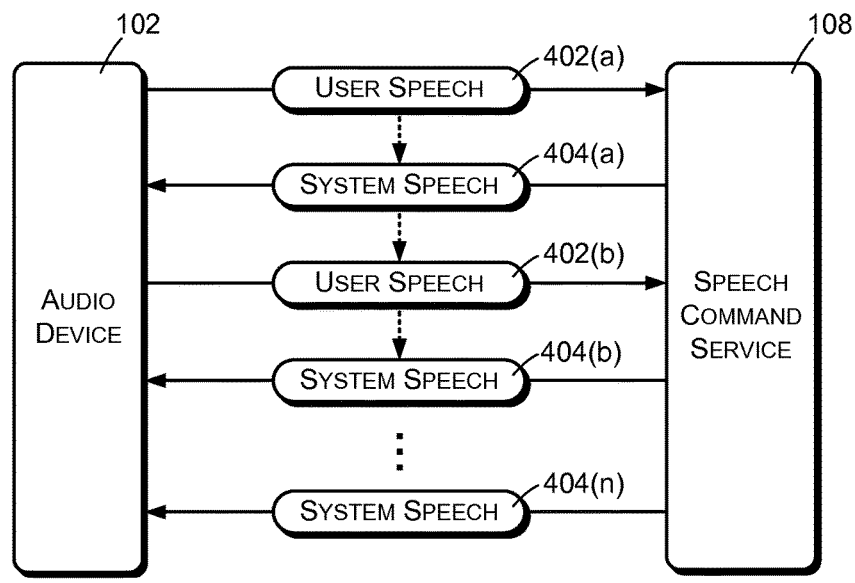
FIG. 4 is a block diagram illustrating an example of a speech dialog.
Figure 5:
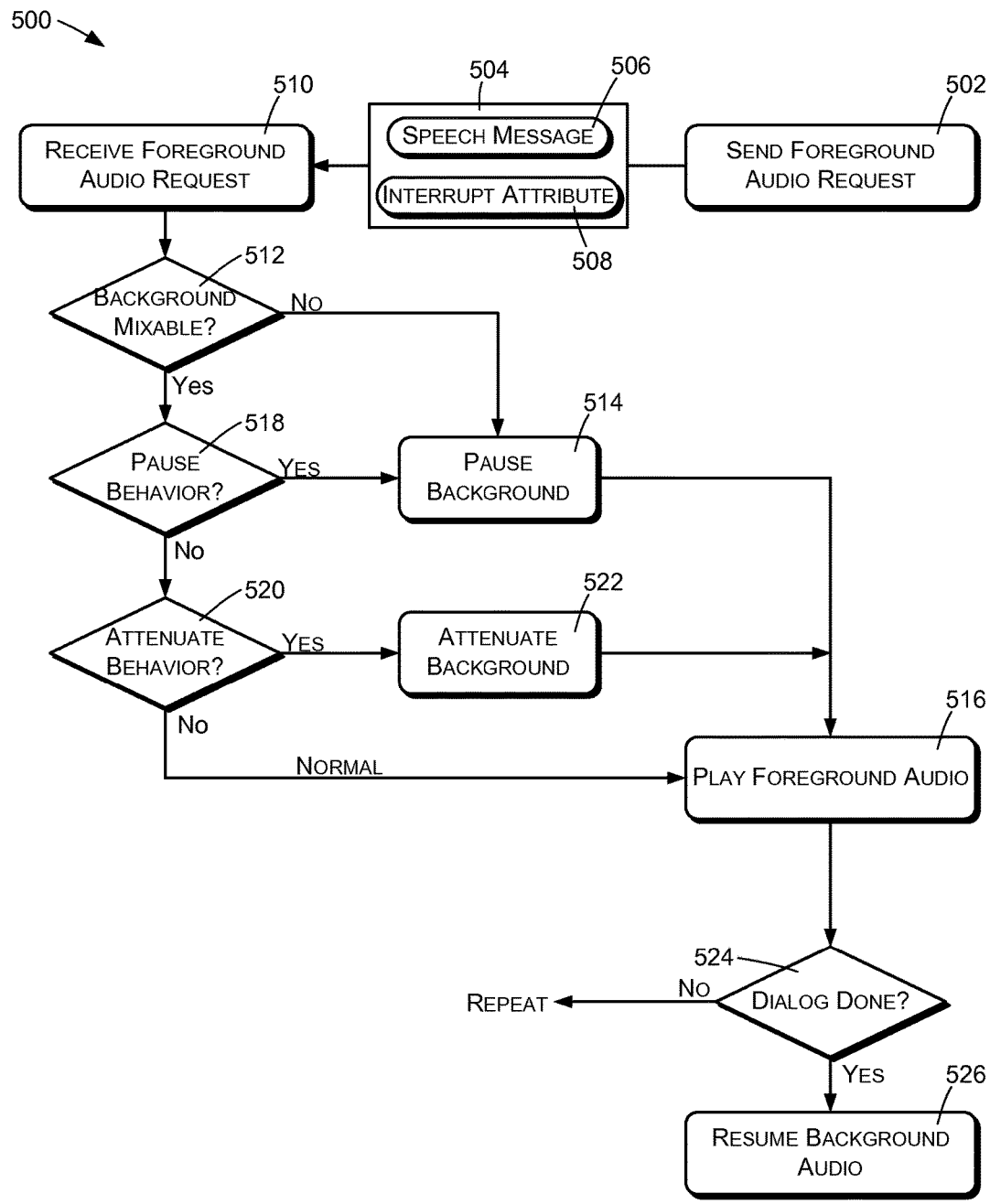
FIG. 5 is a flow diagram illustrating an example method of specifying and playing foreground audio.

FIG. 4 illustrates an example of conducting a speech dialog. Generally, a speech dialog is conducted by the speech command service 108 and the audio device 102 by playing system-generated speech messages on the speaker 112 of the audio device 102 and by providing user utterances obtained from the microphone 110 of the audio device 102 to the speech command service 108. In the example of FIG. 5, the speech command service 108 initially receives user speech 402(a) from the audio device 102 and responds with system or system-generated speech 404(a). More user speech 402(b) is then received and additional system speech 404(b) is generated and provided to the audio device 102 for playing to the user. Alternating user speech and system speech may continue to be exchanged between the audio device 102 and the speech command service 108 in this manner until the speech command service 108 determines an action to perform. In this example, the speech dialog ends with system speech 404(n).

When a speech message is received by the audio device 102, it is played as foreground audio in accordance with its interrupt attribute as described herein. User speech is obtained through the microphone of the audio device 102 as an audio signal that may be streamed to the speech command service 108. The speech command service 108 may be configured to analyze the received audio signal to detect and recognized the user speech contained therein.

FIG. 5 illustrates an example method 500 that may be implemented in an audio-based or speech-based system such as discussed above to play foreground audio content such as speech messages. The speech messages may be played as part of a speech dialog between a user and the speech-based system. An action 502 is performed by a speech command service or other device control component or service that is located remotely from a local, speech-based audio device. The action 502 comprises sending a command 504, referred to herein as a foreground audio command, to the audio device over a network communications medium such as the Internet. The foreground audio command 504 may indicate or specify foreground audio such as a speech message 506, which is to be played by the audio device as part of a speech dialog with a user. The foreground audio command 504 may specify that the speech message or other audio is intended to be played as foreground audio. The foreground audio command 504 may also indicate or specify an interrupt attribute 508 that is to be associated with the speech message 506 or with the speech dialog of which the speech message 506 is a part. The interrupt attribute 508 indicates how background audio should be handled when playing the speech message 506. In the described embodiment, the interrupt attribute 508 may have one of the values normal, attenuate, or pause.

In some embodiments, the speech command service may be configured to designate an attenuation behavior for speech messages that are declarations and to designate a pause behavior when the speech messages are questions.

An action 510, performed by an audio device such as the audio device 102 described above, comprises receiving the foreground audio command 504 from the speech command service through a network communications interface of the audio device. As discussed above, the foreground audio command 504 may contain or specify a speech message 506 and the interrupt attribute 508. The speech message 506 may be part of a speech dialog comprising one or more speech messages and one or more user utterances.

An action 512, performed by the audio device, comprises determining whether or not the mixable attribute of the currently playing background audio indicates a mixable behavior. If the mixable attribute has a value of not_mixable, indicating a non-mixable behavior for the background audio, an action 514 is performed of pausing the currently playing background audio content. An action 516 is then performed of playing the speech message 506 as foreground audio on a speaker of the audio device.

If the mixable attribute of the current background audio is mixable, an action 518 is performed, comprising determining whether the interrupt attribute 508 indicates a pause behavior. If the interrupt attribute 508 has a value of pause, the action 514 is performed of pausing the background audio content. The action 516 is then performed of playing the speech message 506 as foreground audio.

If the interrupt attribute 508 does not have the value pause, an action 520 is performed, comprising determining whether the interrupt attribute 508 indicates an attenuation behavior. If the interrupt attribute 508 has a value of attenuate, an action 522 is performed of attenuating the currently playing background audio to an attenuated volume.

If the interrupt attribute 508 does not have the value pause or the value attenuate, it may be assumed that the interrupt attribute 508 has the value normal, and the action 516 is performed of playing the speech message 506 at the normal listening level or volume.

After playing the speech message 506, an action 524 comprises determining whether the dialog between the speech command service and the user has been completed. If the dialog is not completed, the actions described thus far with respect to FIG. 5 may be repeated as new speech messages are sent by the speech command service and received by the audio device. If the dialog is done, an action 526 is performed comprising resuming playback of the background audio at the normal, unattenuated listening level. If the background audio has been paused, it is restarted at the point where it was paused. If the background audio has been attenuated, playback volume is restored to the normal listening level.

In some situations, a background audio command may be received during a dialog. In these situations, the background audio specified by the background audio command is initiated as either normal, paused, or attenuated, in accordance with the decision tree of FIG. 5. Specifically, the actions 512, 518, and 520 are performed to determine the initial playback state of the background audio. When the dialog is done, playback of the background audio is resumed as described with reference to the action 526.

Although a specific example of a command and communications protocol is described above, the described behaviors of background and foreground audio may be implemented using other protocols. For example, the speech command service 108 may send various types of audio to the device using a single command format that includes (a) audio or an audio specification; (b) a specification of whether the specified audio is to be considered foreground or background and (c) values for any attributes that are to be associated with the audio.

The embodiments described above may be implemented programmatically, such as with computers, processors, digital signal processors, analog processors, and so forth. In other embodiments, however, one or more of the components, functions, or elements may be implemented using specialized or dedicated circuits, including analog circuits and/or digital logic circuits. The term "component", as used herein, is intended to include any hardware, software, logic, or combinations of the foregoing that are used to implement the functionality attributed to the component.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device, comprising:
   one or more processors;
   a speaker;
   a microphone;
   a network communications interface configured to communicate with a remote, network-based speech command service; and
   non-transitory computer-readable media storing computer executable instructions that, when executed by the one or more processors, cause the one or more processors to perform acts comprising:
   receiving a first command from the network-based speech command service to play audio content;
   receiving, from the network-based speech command service, a mixing attribute specified by the network-based speech command service and indicating whether to mix the audio content with additional audio content, the mixing attribute comprising:
   first data specifying that the audio content is not to be played by the speaker at a same time as the additional audio content; or
   second data specifying that the audio content is to be played by the speaker at the same time as the additional audio content;
   playing the audio content on the speaker at a first volume;
   receiving a second command from the network-based speech command service to play a speech message, wherein the speech message corresponds to a type of the additional audio content;

receiving an interrupt attribute from the network-based speech command service, wherein the interrupt attribute corresponds to the speech message, wherein the interrupt attribute is specified by the network-based speech command service and specifies whether the audio content is to be attenuated or paused while the speech message is played, the interrupt attribute comprising:
  third data specifying that the audio content is to be attenuated while the speech message is played; or
  fourth data specifying that the audio content is to be paused while the speech message is played;
playing the speech message on the speaker;
based at least in part on the mixing attribute comprising the second data and the interrupt attribute comprising the third data, lowering playback volume of the audio content to a second volume during playing of the speech message; and
based at least in part on one or more of the mixing attribute comprising the first data or the interrupt attribute comprising the fourth data, pausing the playing of the audio content during playing of the speech message.

2. The device of claim 1, further comprising resuming playing the audio content at the first volume after playing the speech message.

3. The device of claim 1, wherein the device obtains the audio content from a remote source different than the network-based speech command service.

4. The device of claim 1, wherein the second command to play the speech message was received in response to an utterance of a user, wherein the utterance of the user was transmitted to the network-based speech command service.

5. The device of claim 1, wherein:
  the first data comprises one or more first words which specify that the audio content is to be paused while the speaker plays the additional audio content; and
  the second data comprises one or more second words which specify that the audio content is to be played by the speaker at the same time as the additional audio content.

6. One or more non-transitory computer-readable media storing computer-executable instructions that, when executed by one or more processors, cause the one or more processors to perform acts comprising:
  receiving a command from a network-based speech command service that specifies audio content;
  in response to receiving the command, playing the audio content at a first volume;
  receiving a speech message from the network-based speech command service;
  receiving, from the network-based speech command service, a first attribute associated with the audio content, specified by the network-based speech command service, and indicating whether to mix the audio content with the speech message, the first attribute comprising:
    first data specifying that the audio content is to be played while the speech message is played; or
    second data specifying that the audio content is to be paused while the speech message is played;
  receiving a second attribute associated with the speech message and specified by the network-based speech command service, the second attribute comprising:
    third data specifying that the audio content is to be attenuated while the speech message is played; or
    fourth data specifying that the audio content is to be paused while the speech message is played;
  playing the speech message;
  based at least in part on the first attribute comprising the first data and the second attribute comprising the third data, lowering playback volume of the audio content to a second volume while playing the speech message;
  based at least in part on the first attribute comprising the first data and the second attribute comprising the fourth data, pausing the playback of the audio content while playing the speech message; and
  based at least in part the first attribute comprising the second data, pausing the playing of the audio content while playing the speech message.

7. The one or more non-transitory computer-readable media of claim 6, further comprising:
  conducting a dialog with a user, wherein conducting the dialog comprises playing the speech message and receiving speech from the user;
  lowering playback volume of the audio content to the second volume while conducting the dialog based at least in part on determining that the second attribute comprises the third data; and
  pausing the playing of the audio content while conducting the dialog based at least in part on determining that the second attribute comprises the fourth data.

8. The one or more non-transitory computer-readable media of claim 6, further comprising:
  based at least in part on the first attribute comprising the first data and the second attribute comprising the third data, lowering the playback volume to the second volume while conducting a dialog with a user, wherein conducting the dialog comprises playing the speech message and receiving speech from the user; and
  resuming playing the audio content at the first volume after conducting the dialog.

9. The one or more non-transitory computer-readable media of claim 6, wherein:
  the third data further specifies that the audio content is to be attenuated when the speech message is a declaration; and
  the fourth data further specifies that the audio content is to be paused when the speech message is a question.

10. The one or more non-transitory computer-readable media of claim 6, further comprising streaming the audio content from a network-based content provider.

11. The one or more non-transitory computer-readable media of claim 6, further comprising receiving the audio content from a local wireless device.

12. The one or more non-transitory computer-readable media of claim 6, further comprising lowering the playback volume of the audio content to the second volume in response to detecting speech from a user.

13. The one or more non-transitory computer-readable media of claim 6, wherein:
  the third data includes one or more words describing an attenuate value; and
  the fourth data includes one or more words describing a pause value.

14. A computing device comprising:
  one or more processors;
  a speaker; and
  one or more non-transitory computer-readable media storing computer-executable instructions that, when executed by the one or more processors, cause the one or more processors to perform operations comprising:
    receiving, over a network and from a network-based speech command system, a first command to output first audio content;

receiving, from the network-based speech command system, a mixing attribute specified by the network-based speech command system and indicating whether to mix the first audio content with additional audio content, the mixing attribute comprising:
  first data specifying that the first audio content is not to be played by the speaker at a same time as the additional audio content; or
  second data specifying that the first audio content is to be played by the speaker at the same time as the additional audio content;
playing the first audio content on the speaker at a first volume;
receiving a second command from the network-based speech command system to play second audio content, wherein the second audio content corresponds to a type of the additional audio content;
receiving an interrupt attribute from the network-based speech command system, wherein the interrupt attribute corresponds to the second audio content, wherein the interrupt attribute is specified by the network-based speech command system and specifies whether the first audio content is to be attenuated or paused while the second audio content is played, the interrupt attribute comprising:
  third data specifying that the first audio content is to be attenuated while the second audio content is played; or
  fourth data specifying that the first audio content is to be paused while the second audio content is played;
playing the second audio content on the speaker;
based at least in part on the mixing attribute comprising the second data and the interrupt attribute comprising the third data, lowering playback volume of the first audio content to a second volume during playing of the second audio content; and
based at least in part on one or more of the mixing attribute comprising the first data or the interrupt attribute comprising the fourth data, pausing the playing of the first audio content during playing of the second audio content.

15. The computing device of claim 14, wherein the second audio comprises a speech message.

16. The computing device of claim 14, wherein the second audio content comprises a speech message that forms part of a speech dialog with a user.

17. The computing device of claim 14, wherein the second audio content comprises a speech message that forms part of a speech dialog with a user, and
  the operations further comprising resuming playing of the first audio content at the first volume after conducting the speech dialog.

18. The computing device of claim 14, the operations further comprising streaming the first audio content from a network-based content provider.

* * * * *